US007084398B2

(12) United States Patent
Loboda et al.

(10) Patent No.: US 7,084,398 B2
(45) Date of Patent: Aug. 1, 2006

(54) METHOD AND APPARATUS FOR SELECTIVE AXIAL EJECTION

(75) Inventors: Alexander Loboda, North York (CA); Frank Londry, Peterborough (CA)

(73) Assignee: Sciex division of MDS Inc., Concord (CA)

( * ) Notice: Subject to any disclaimer, the term of this patent is extended or adjusted under 35 U.S.C. 154(b) by 0 days.

(21) Appl. No.: 11/122,097

(22) Filed: May 5, 2005

(65) Prior Publication Data

US 2005/0253064 A1 Nov. 17, 2005

Related U.S. Application Data

(60) Provisional application No. 60/567,817, filed on May 5, 2004.

(51) Int. Cl.
*H01J 49/42* (2006.01)
*B01D 59/44* (2006.01)

(52) U.S. Cl. ...................... 250/292; 250/281; 250/282; 250/290

(58) Field of Classification Search ..................... None
See application file for complete search history.

(56) References Cited

U.S. PATENT DOCUMENTS

| | | | |
|---|---|---|---|
| 4,234,791 A | 11/1980 | Enke et al. | |
| 5,689,111 A | 11/1997 | Dresch et al. | |
| 5,847,386 A | 12/1998 | Thomson et al. | |
| 6,111,250 A * | 8/2000 | Thomson et al. | 250/282 |
| 6,177,668 B1 | 1/2001 | Hager | |
| 6,285,027 B1 | 9/2001 | Chernushevich et al. | |
| 6,504,148 B1 | 1/2003 | Hager | |
| 6,630,662 B1 * | 10/2003 | Loboda | 250/281 |
| 6,744,043 B1 | 6/2004 | Loboda | |

FOREIGN PATENT DOCUMENTS

| | | |
|---|---|---|
| CA | 2364676 | 6/2002 |

OTHER PUBLICATIONS

Akhiko Okumura, "Orthogonal Trap-TOF Mass Spectrometer (1)—Synchronous Coupling Of Trap and TOF", Proceedings of The 51st ASMS Conference on Mass Spectrometry and Allied Topics, Montreal, Quebec, Canada, Jun. 8-12, 2003.

Igor V. Chernushevich et al., "An introduction to quadrupole-time-of-flight mass spectrometry", Journal of Mass Spectrometry, *J.Mass Spectrom.* 2001; 36: 849-865.

(Continued)

*Primary Examiner*—Nikita Wells
(74) *Attorney, Agent, or Firm*—Bereskin & Parr

(57) ABSTRACT

A mass spectrometer system and a method of operating a mass spectrometer having an elongated rod set, the rod set having an entrance end, an exit end, a plurality of rods and a longitudinal axis, involving (a) admitting ions into the entrance end of the rod set; (b) producing an RF field between the plurality of rods to radially confine the ions in the rod set; (c) providing a static axial electric field within the rod set; and (d) separating the ions into a first group of ions and a second group of ions by providing an oscillating axial electric field within the rod set to counteract the static axial electric field, wherein the oscillating axial electric field varies along the longitudinal axis of the rod se.

28 Claims, 12 Drawing Sheets

OTHER PUBLICATIONS

Dieter Gerlich, (1992)—from: State-Selected and State-to-State Ion-Molecule Reaction Dynamics, edited by C.Y.Ng and M. Baer Advances in Chemcial Physics Series, LXXXII, J. Wiley & Sons (1992) "Inhomogeneous RF Fields: A Versatile Tool for the Study of Processes with Slow Ions" Fakultät fur Physik, Universität Freiburg, Freigurg, Germany.

* cited by examiner

METHOD AND APPARATUS FOR SELECTIVE AXIAL EJECTION

RELATED APPLICATION

This application claims the benefit of U.S. provisional patent application Ser. No. 60/567,817, filed May 5, 2004, and entitled Time of Flight Mass Spectrometer, the entire contents of which are hereby incorporated by reference.

FIELD OF THE INVENTION

The present invention relates generally to mass spectrometry, and more particularly relates to a method and apparatus for selective axial ejection.

BACKGROUND OF THE INVENTION

Many types of mass spectrometers are known, and are widely used for trace analysis to determine the structure of ions. These spectrometers typically separate ions based on the mass-to-charge ratio ("m/z") of the ions.

For example, a tandem mass spectrometer might include a mass selection section, followed by a fragmentation cell, and then a further mass resolving section. Typically in MS/MS analysis, one precursor or parent ion would be selected in the first mass selection section. The rest of the ions would be rejected in this first mass selection section. Then, this parent or precursor ion of interest would be fragmented in the fragmentation cell. These fragments are then provided to a downstream mass resolving section in which a particular fragment of interest is selected. The remainder of the fragments would typically be rejected.

This approach is inefficient when tandem mass spectrometry is used to analyze a mixture of analyte substances. That is, when one type of ion is selected as a precursor for MS/MS experiments, ions representing other substances in the mixture will be filtered out and lost. If these ions representing other substances are also of interest, then it will be necessary to run subsequent MS/MS analysis focused on these other ions of interest, thereby increasing the time and expense of conducting these experiments.

Another mode of operation of tandem mass spectrometry is called "a precursor ion scan". In this mode of operation, the filtering window between an initial rod section and a downstream fragmentation cell is varied slowly to selectively admit precursor ions. Each of these precursor ions can than be fragmented in the fragmentation cell, and subjected to further mass analysis downstream of the fragmentation cell by other MS/MS instruments as required, to generate fragmentation spectra. From these fragmentation spectra generated for different ions, a desired fragmentation spectrum can be identified. Again, however, in this mode of operation, efficiency is quite low as most of the ions are filtered out. For example, if the filtering window is 1 Thomson, and the scanning interval is 1000 Thomson, then overall efficiency of the instrument will drop by a factor of 1000 in comparison to an MS/MS experiment for a single precursor ion of interest. Accordingly, MS/MS operation will be substantially improved in terms of both sensitivity and efficiency if all of the ions representing different components of a mixture can be stored and introduced into a fragmentation stage on a selective basis without the efficiency losses described above.

Tandem mass spectrometers may also include upstream quadrupole mass analyzers, in which RF/DC ion guides are used to transmit ions within a narrow range of m/z values to downstream "time-of-flight" ("TOF") analyzers, in which measuring the flight time over a known path for an ion allows its m/z to be determined.

Unlike quadrupole mass analyzers, TOF analyzers can record complete mass spectra without the need for the scanning parameters of a mass filter, thus providing a better duty cycle and a higher acquisition rate (ie. a more rapid turnaround in the analysis process). In certain mass spectrometers, RF ion guides are coupled with orthogonal TOF mass analyzers where the ion guide is for the purpose of transmitting ions to the TOF analyzer, or is used as a collision cell for producing fragment ions and for delivering the fragment ions (in addition to any remaining parent ions) to the TOF analyzer. Combining an ion guide with the orthogonal TOF analyzer is a convenient way of delivering ions to a TOF analyzer for analysis.

It is presently known to employ at least two modes of operation of orthogonal TOF mass spectrometers employing ion guides.

In the first mode, a continuous stream of ions leaves a radio-frequency-only quadrupole ion guide comprising a collision cell and a mass filter and is directed to an extraction region of the TOF analyzer. The stream is then sampled by TOF extraction pulses for detection in the normal TOF manner. This mode of operation has duty cycle losses as described, for example, in a tutorial paper by Chernushevich et al., in the Journal of Mass Spectrometry, 2001, Vol. 36, 849–865, ("Chernushevich et al.").

The second mode of operation is described in Chernushevich et al., as well as in U.S. Pat. No. 5,689,111 and in U.S. Pat. No. 6,285,027. This mode involves pulsing ions out of a two-dimensional ion guide such that ions having particular m/z values (i.e., m/z values within narrowly-defined ranges) are bunched together in the extraction region of the TOF. This mode of operation reduces transmission losses between the ion guide and the TOF, but due to the dependence of ion velocity on the m/z ratio only ions from a small m/z range can be properly synchronized, leading to a narrow range of m/z (typical $m_{max}/m_{min}$ ~2) that can be effectively detected by the TOF analyzer. Thus, when ions with a broad range of masses have to be recorded, it is necessary to transmit multiple pulses having parameters specific to overlapping m/z ranges in order to record a full spectrum. This results in inefficiencies since ions outside the transmission window are either suppressed or lost. One way to avoid this loss is proposed in commonly assigned U.S. Pat. No. 6,744,043. In this patent, an ion mobility stage is employed upstream of the TOF analyzer. The mobility migration time of the ions is somewhat correlated with the m/z values of the ions. This allows for adjustment of TOF window in pulsed mode so that the TOF window is always tuned for the m/z of ions that elute from the ion mobility stage. However, addition of the mobility stage to the spectrometer apparatus increases the complexity and cost of the apparatus. Moreover, the use of pulsed ejection and corresponding continual adjustment of the TOF window prevents optimal efficiencies in cycle time, or process turnaround, for the spectrometer.

SUMMARY OF THE INVENTION

In accordance with a first aspect of the invention, there is provided a method of operating a mass spectrometer having an elongated rod set, the rod set having an entrance end, an exit end, a plurality of rods and a longitudinal axis. The method comprises: (a) admitting ions into the entrance end of the rod set; (b) producing an RF field between the plurality of rods to radially confine the ions in the rod set; (c)

providing a static axial electric field within the rod set; and (d) separating the ions into a first group of ions and a second group of ions by providing an oscillating axial electric field within the rod set to counteract the static axial electric field, wherein the oscillating axial electric field varies along the longitudinal axis of the rod set.

In accordance with a second aspect of the invention, there is provided mass spectrometer system comprising: (a) an ion source; (b) a rod set, the rod set having a plurality of rods extending along a longitudinal axis, an entrance end for admitting ions from the ion source, and an exit end for ejecting ions traversing the longitudinal axis of the rod set; and, (c) a power supply module for producing an RF field between the plurality of rods of the rod set, wherein the power supply module is coupled to the rod set to provide a selected static axial electric field and a selected oscillating electric field such that (i) the selected oscillating axial electric field varies along the longitudinal axis of the rod set, and (ii) the selected static axial electric field and the selected oscillating axial electric field counteract each other to separate the ions into a first group of ions and a second group of ions based on a selected mass-to-charge ratio.

BRIEF DESCRIPTION OF THE DRAWINGS

A detailed description of the preferred aspects of the present invention is provided herein below with reference to the following drawings, in which.

Figure 4:
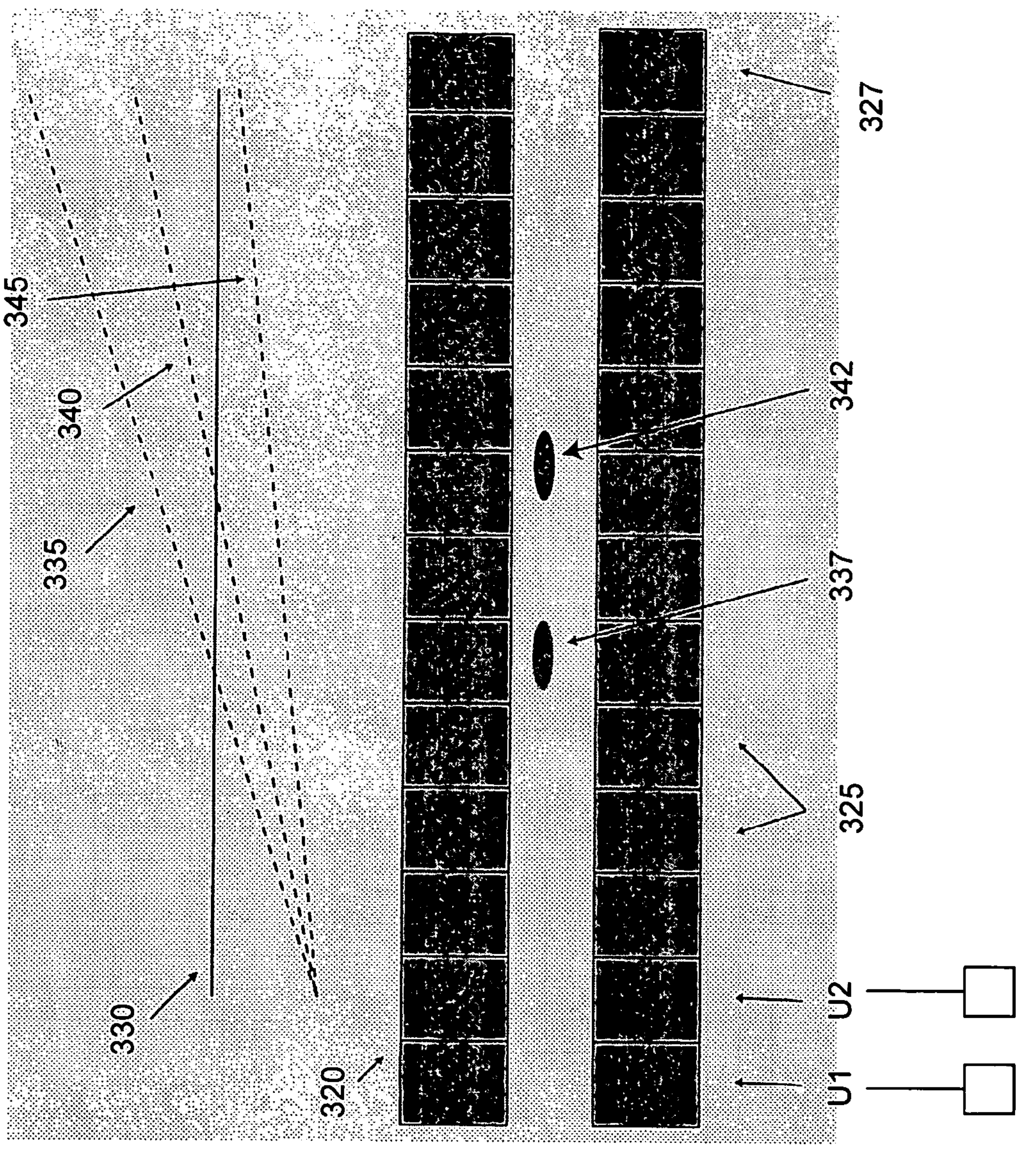
FIG. 4, in a schematic view, illustrates an ion guide and sketches potential distributions along the axis of the ion guide in accordance with a fourth preferred embodiment of the invention.
Figure 5:
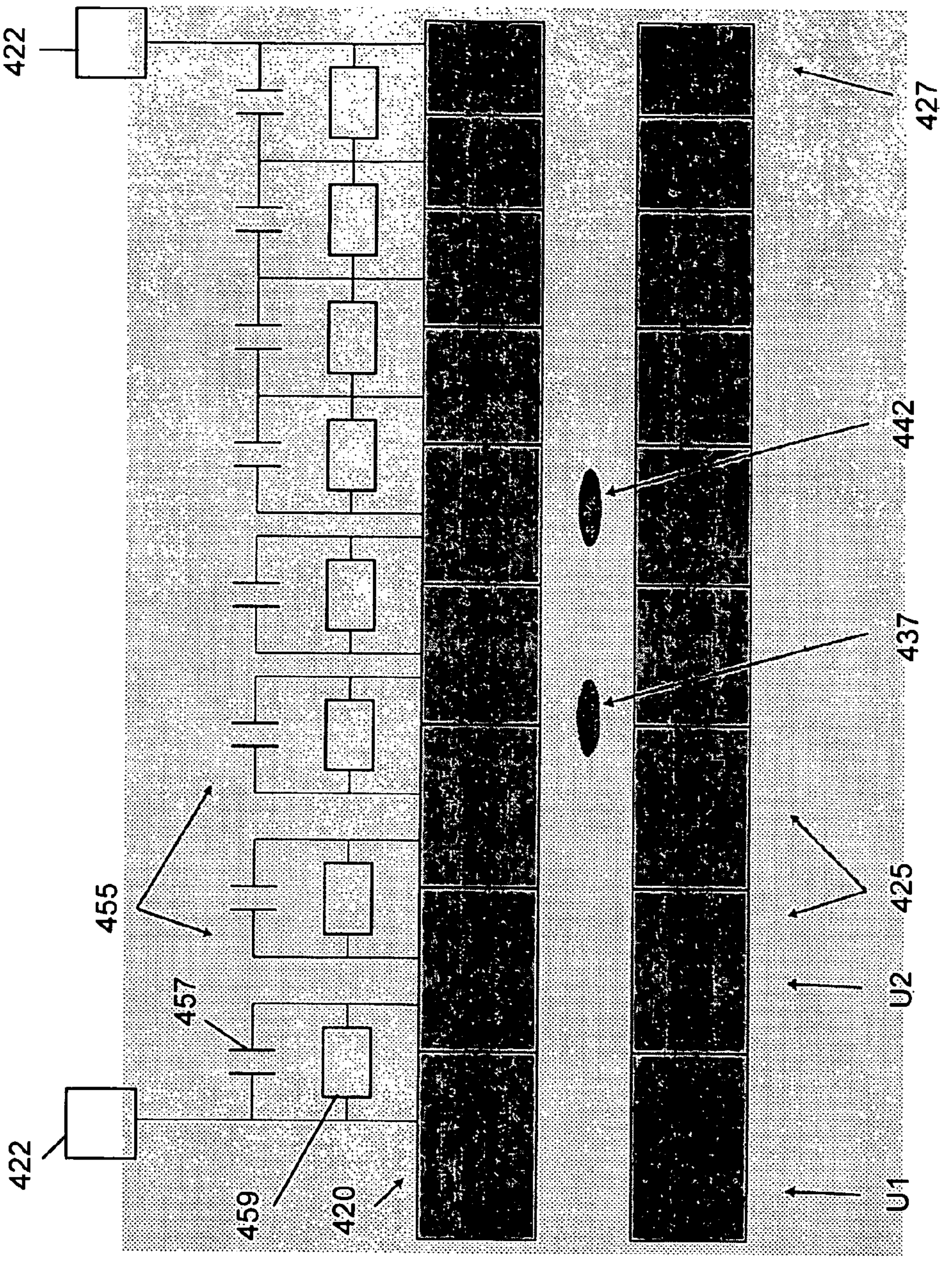
Figure 6:
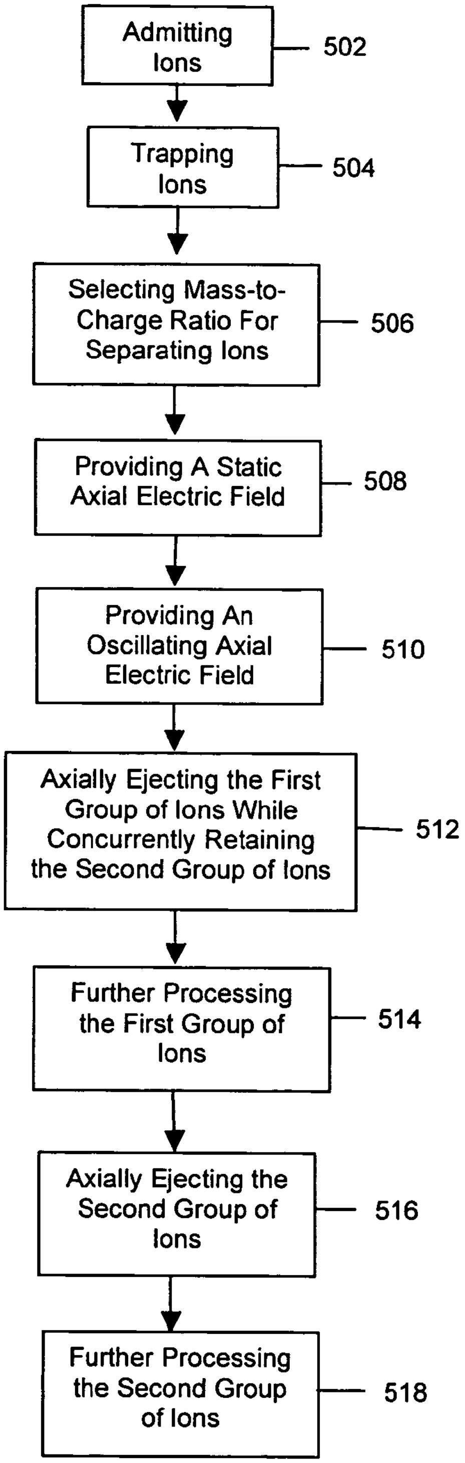
Figure 7:
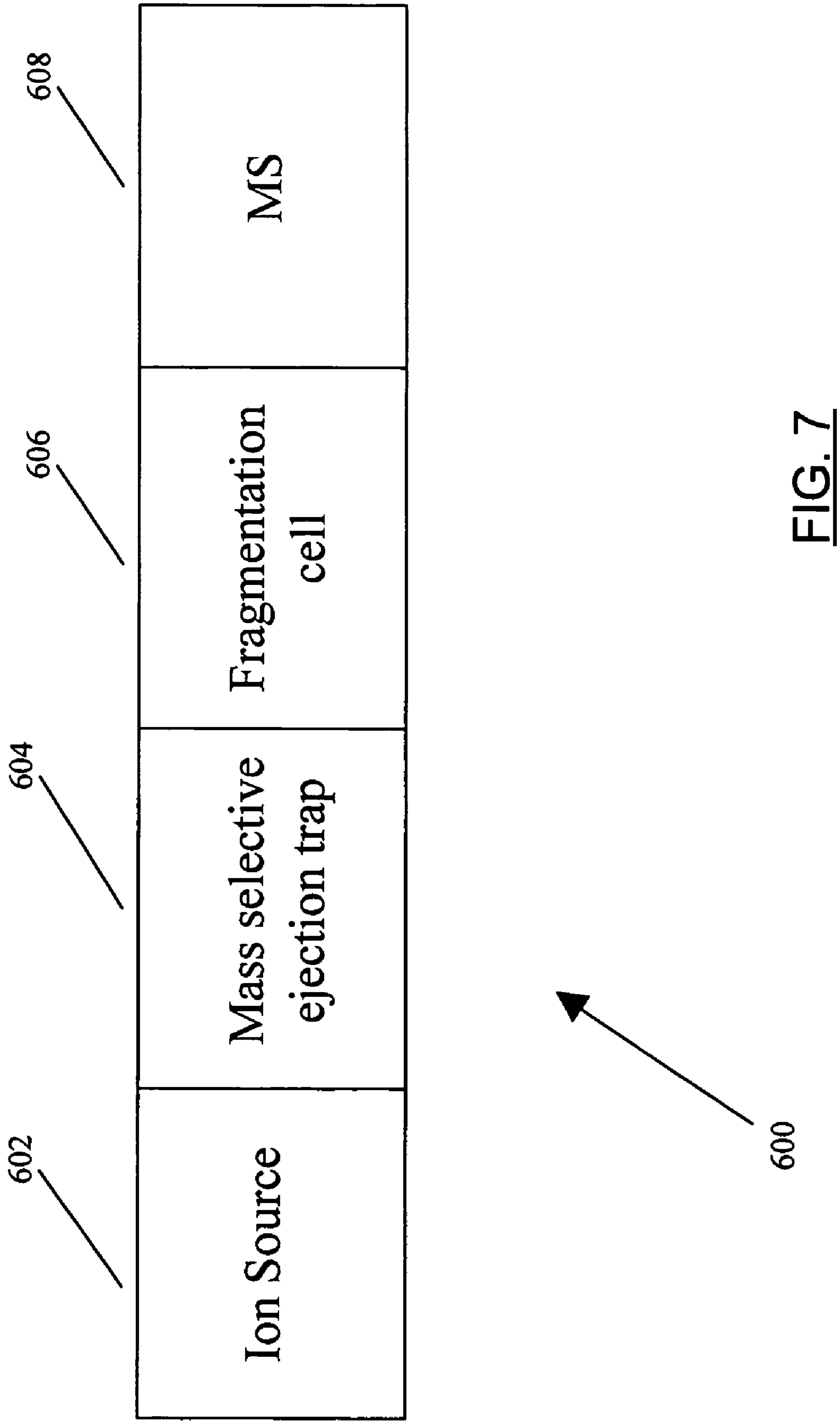
Figure 8:
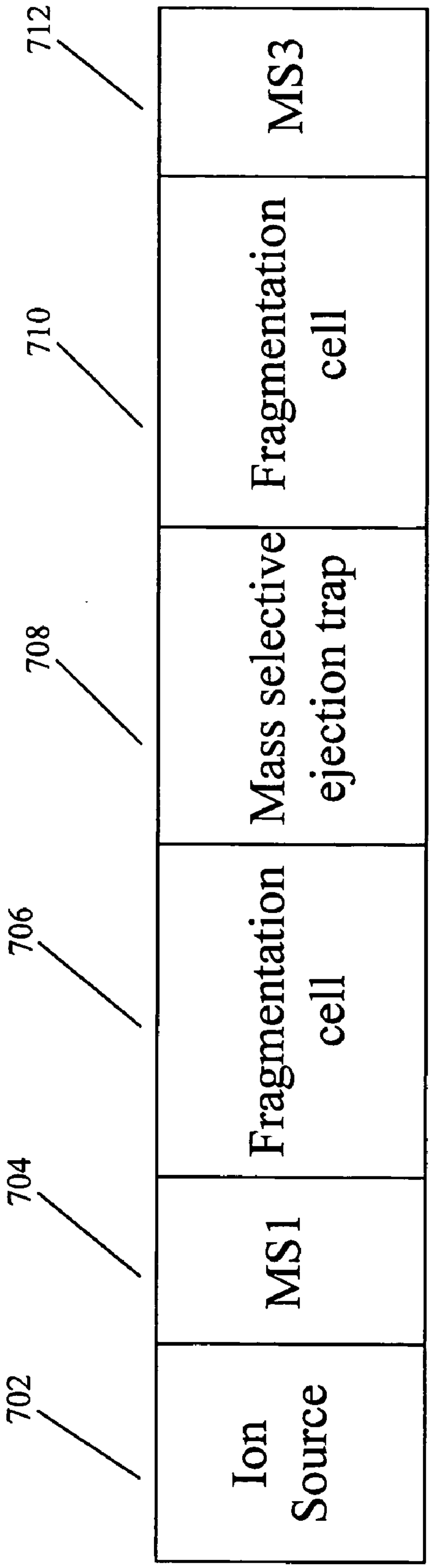
Figure 9:
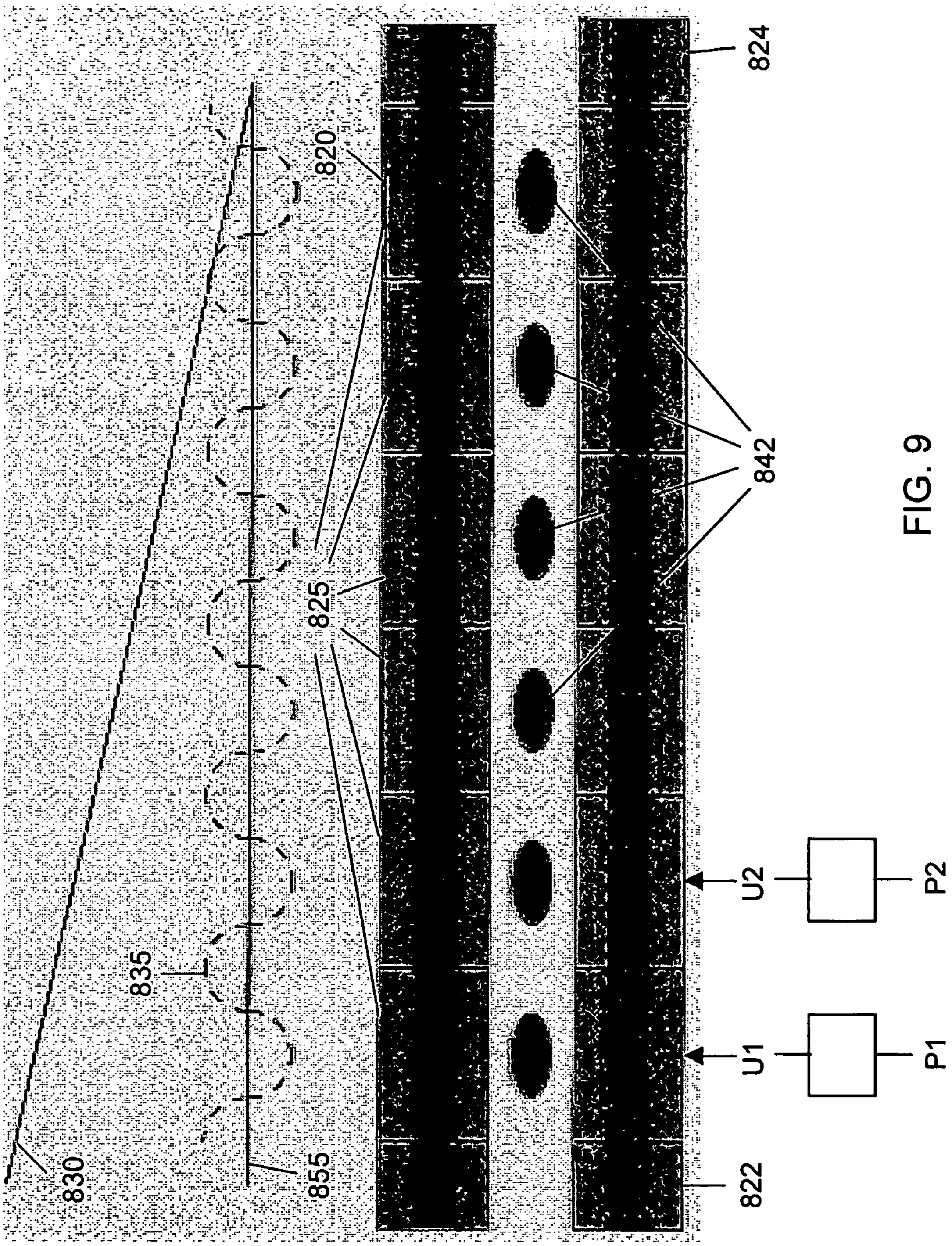

FIG. **4*a* in a schematic view, illustrates the ion guide of FIG. 4** together with individual power supply units in more detail;

FIG. 5, in a schematic view, illustrates an ion guide in accordance with a fifth preferred aspect of the present invention;

FIG. **5*a***, in a schematic view, illustrates an ion guide in accordance with a sixth preferred aspect to the present invention;

FIG. **5*b***, in a schematic view, illustrates an ion guide in accordance with a seventh preferred aspect of the present invention;

FIG. 6, in a flowchart, illustrates a method of separating ions in accordance with a further aspect of the present invention;

FIG. 7 in a block diagram illustrates an MS/MS arrangement in accordance with an aspect of the invention;

FIG. 8 in a block diagram illustrates a second MS/MS arrangement in accordance with a further aspect of the present invention; and, FIG. 9, in a schematic view, illustrates an ion guide in accordance with a further aspect of the present invention.

DETAILED DESCRIPTION OF PREFERRED ASPECTS OF THE PRESENT INVENTION

Figure 1:
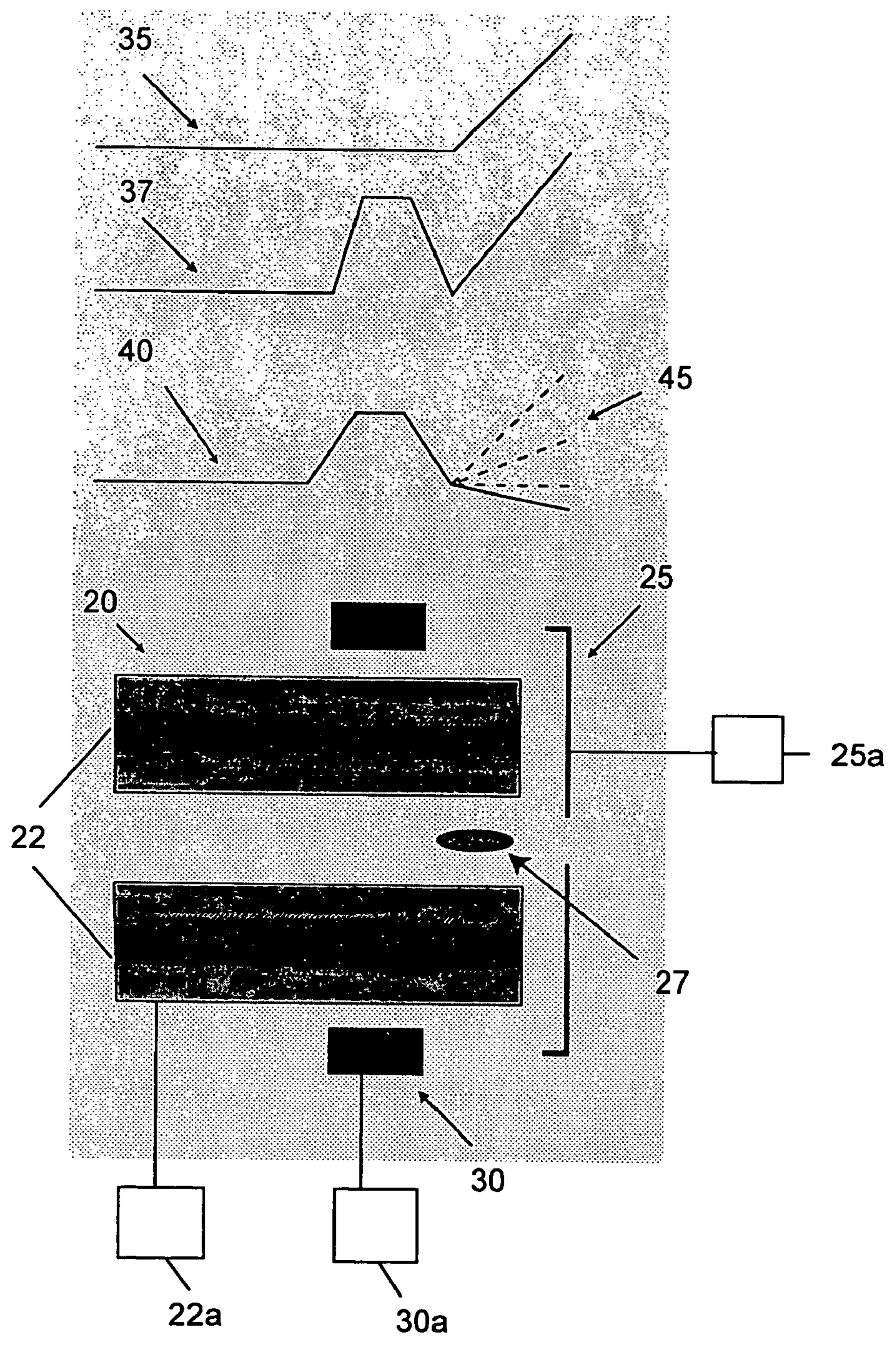
FIG. 1, in a schematic view, illustrates an ion guide and sketches the potential distributions along the axis of the ion guide in accordance with a preferred embodiment of the invention.

Referring to FIG. 1, there is illustrated in a schematic view, an ion guide 20 in accordance with a preferred aspect of the present invention. The ion guide 20 is represented by a set of rods 22 with RF voltage applied to them (in a known manner) by rod power supply **22*a* to provide confinement of ions in a radial direction. The end of the ion guide 20 can be blocked by supplying an appropriate voltage from exit power supply 25*a* to an electrode 25. This exit electrode voltage can include a static DC and alternating AC components. The ions can be trapped in region 27 between exit electrode 25 and an additional barrier electrode 30 positioned such that it influences axial field distributions in the ion guide 20. An appropriate voltage is supplied to barrier electrode 30 by power supply 30*a***.

The operating cycle of the ion guide 20 is depicted by a sketch of distributions of the potential along an axis of the ion guide 20—shown as lines 35, 37 and 40 in FIG. 1. During an accumulation period, represented by distribution potential 35, the ions are allowed to fill the ion guide 20. After a certain interval a selected group of these ions is isolated from other ions in the ion guide 20 by applying an appropriate voltage to a barrier electrode 30 to trap ions of different m/z ranges on opposite sides of the barrier electrode 30—the selected ions of interest being trapped adjoining the exit electrode 25 in region 27. The distribution of potential along the axis of the ion guide in this intermediate interval is illustrated by line 37 of FIG. 1. Then, in the last interval, the distribution potential for which is represented by line 40, the trapped ions in region 27 can be mass selectively ejected out of the ion guide 20 by varying the amplitude of at least one of the AC or DC potential applied to the exit barrier 25 or to the main rods 22 or to both the exit barrier 25 and the main rods 22.

For example, the DC potential difference between the rod offset and the exit barrier 25 is such that it creates an axial force that pulls ions towards the exit. Simultaneously, the AC voltage applied to the exit barrier 25 creates a mass dependant effective force repelling ions from the exit barrier. The net effect of these two forces can be to push ions with m/z above a threshold determined by the amplitudes of the DC and AC voltages through the exit barrier 25, while ions with m/z below this threshold are retained in the ion guide 20 by the exit barrier 25. This mass selective axial ejection of ions is illustrated in the distribution potential 40 by stippled lines 45 indicating the different potential distributions at which ions of differing m/z are axially ejected. By this means, ions can be sequentially eluted out of the ion guide 20 by varying the AC and/or DC voltages applied to the exit barrier 25 or to the rods 22 or to both the exit barrier 25 and the rods 22. As the effective force due to the AC voltage can also depend on the frequency of the AC voltage, this frequency may also be varied in order to scan the m/z threshold for ion ejection.

Figure 2:
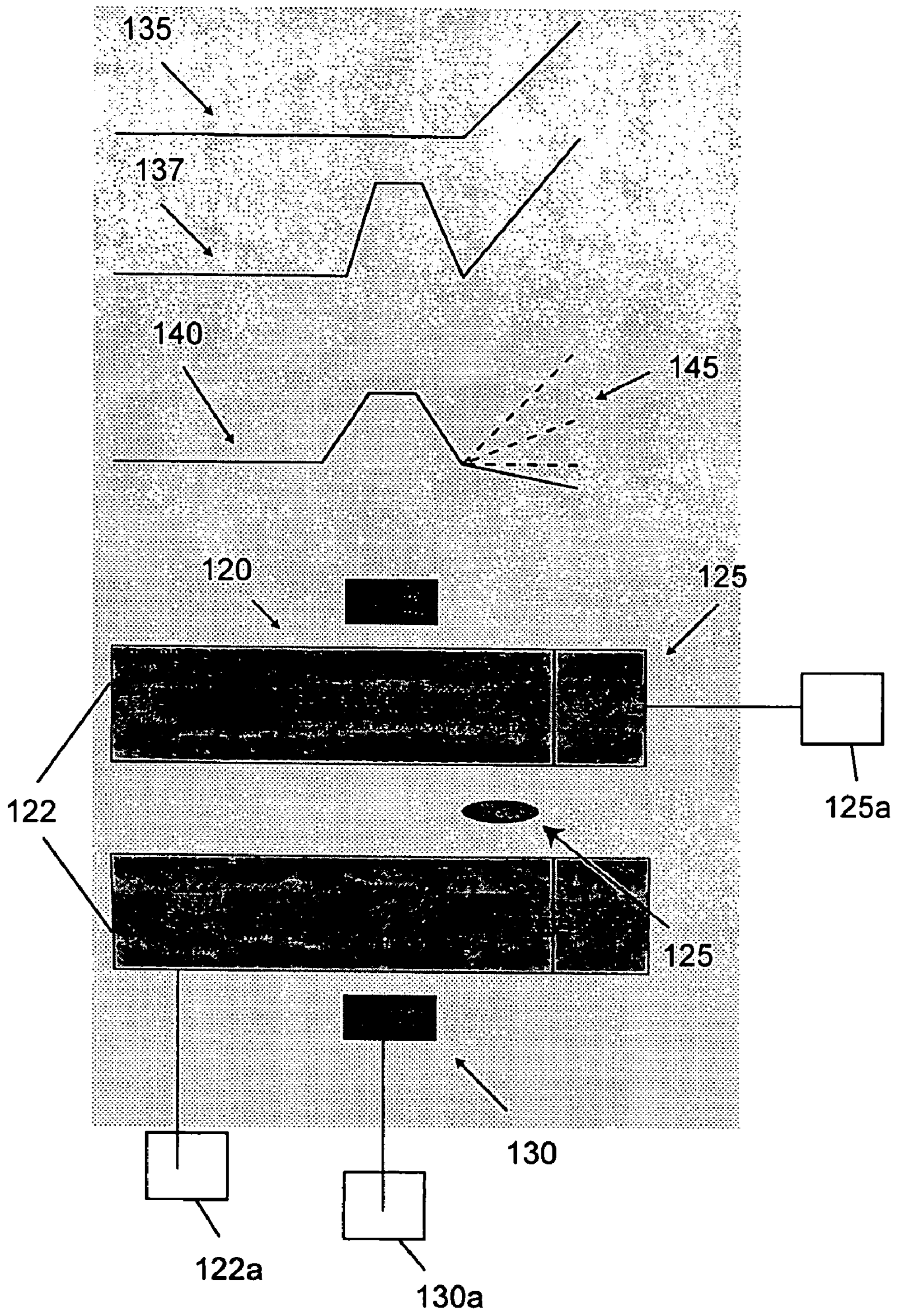
FIG. 2, in a schematic view, illustrates an ion guide and sketches potential distributions along the axis of the ion guide in accordance with a second preferred embodiment of the invention.

Referring to FIG. 2, there is illustrated in a schematic view, an ion guide 120 in accordance with a second preferred aspect of the present invention. With the ion guide 20 in FIG. 1, the RF fields provided to the ion guide 120 by rod power supply **122*a* are often reduced toward the exit of the ion guide 120. As a result, the strength of the radial confinement of the ion beam may decline towards the exit, which may, in turn, broaden the spatial and velocity distribution of ions exiting the trap. Further, unwanted coupling of motion caused by the RF field and the AC field in the fringing field region near the exit can further distort spatial and velocity distributions. Ion guide 120 of FIG. 2** includes features to address this problem.

Similar to the ion guide 20 of FIG. 1, the ion guide 120 of FIG. 2 includes a set of rods 122 with RF fields applied to them in a known manner to radially confine the ions. The end of ion guide 120 can be blocked by application of an appropriate voltage supplied by exit power supply 125*a* to each rod in segmented region 125, which takes the place of exit barrier 25 in the ion guide 20 of FIG. 1. This exit voltage can include a static DC and alternating AC components. Ions 127 can be trapped between segmented region 125 and an additional barrier electrode 130 positioned such that it influences axial field distributions in the ion guide 120. An appropriate voltage is supplied to barrier electrode 130 by barrier power supply 130*a*.

The operating cycle of the ion guide 120 is depicted by a sketch of distributions of the potential along an axis of the ion guide 120—shown as lines 135, 137 and 140 in FIG. 2. During an accumulation period, represented by distribution potential 135, the ions are allowed to fill the ion guide 120. After a certain internal a selected group of these ions are isolated from other ions in the ion guide 120 by applying an appropriate voltage to barrier electrode 130 to trap ions of different m/z on opposite sides of the barrier electrode 130—the selected ions of interest being trapped in area 127 adjoining segmented region 125. The distribution of potential along the axis of ion guide 120 in this intermediate interval is illustrated by line 137 of FIG. 2. Then, in the last interval, the distribution potential for which is represented by line 140, the trapped ions can be mass selectively ejected out of the ion guide 120 by varying the amplitude of at least one of the AC or DC potentials applied to the segmented region of 125 or to the main rods 122 or to both the segmented region 125 and the main rods 122. AC and DC potentials are then used to create an axial force and a counteracting effective force to push ions with m/z above a selected threshold through the segmented region 125, while ions with m/z below this threshold are retained in the ion guide 120 between the segmented region 125 and the barrier electrode 130. This mass selective ejection of ions is illustrated in the distribution potential 140 by stippled lines 145, indicating the different potential distributions at which ions of differing m/z are axially rejected. By this means, similar to the ion guide 120 of FIG. 1, ions can be sequentially eluted out of the ion guide 120 by varying the AC and/or DC voltages applied to the segmented region 125 or to the rods 122 or to both the segmented region 125 and the rods 122. Further, segmented region 125 radially confines the ion beam toward the exit of ion guide 120, thereby reducing the spatial and velocity distribution of ions exiting the ion guide 120.

Figure 3:
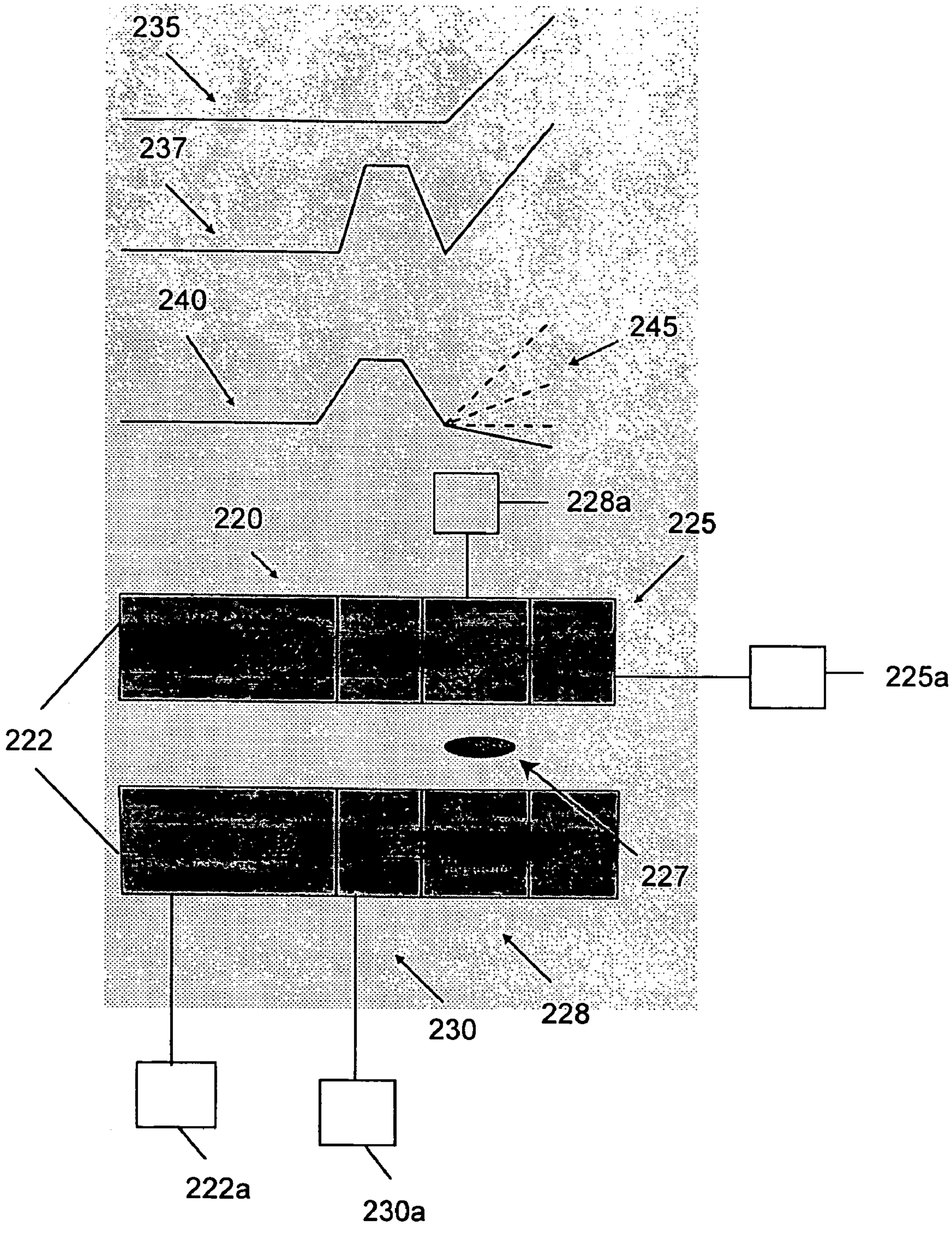
FIG. 3, in a schematic view, illustrates an ion guide and sketches potential distributions along the axis of the ion guide in accordance with a third preferred embodiment of the invention.

Referring to FIG. 3, there is illustrated in a schematic view, an ion guide 220 in accordance with a third preferred aspect of the present invention. The ion guide 220 comprises rods 222, while a segmented electrode or region 225 provides the exit barrier at the end of the ion guide 220. The same RF voltage that is applied to the rods 222 of the ion guide 220 by rod power supply 222*a* is also applied to segmented electrodes 225, 228 and 230 by segment power supplies 225*a*, 228*a* and 230*a* respectively, to radially confine the ion beam within the ion guide 220. Of course, the same RF voltage need not necessarily be applied to each of the segmented electrodes 225, 228 and 230 as is applied to the remainder of the rods 222, as different RF voltages and even different RF frequencies could be used at different segments, provided that these voltages and frequencies radially confine the ion beam.

The operating cycle of the ion guide 220 of FIG. 3 is similar to the operating cycle of the ion guide 20 of FIG. 1. That is, the ions can be trapped within the area 227 bordered by segmented region 228 between the segmented region 225 and the segmented region 230. The operating cycle of the ion guide 222 is depicted by potential distributions 235, 237 and 240 along the axis of the ion guide 220. During an accumulation period, represented by distribution potential 235, the ions are allowed to fill the ion guide 220. After a certain interval, a selected group of these ions are isolated from other ions in the ion guide 220 by applying an appropriate voltage to segmented region 230 to trap ions of different m/z ranges on opposite sides of the segmented region 230—the selected ions of interest being trapped between segmented regions 230 and 225. The distribution of potential along the axis of the ion guide in this intermediate interval is illustrated by line 237 of FIG. 3. Then, in the last interval, the distribution potential for which is represented by line 240, the trapped ions can be mass selectively ejected out of the ion guide 220 by varying the amplitude of at least one of the AC or DC potential applied to each of the rods in the segmented region 225 or to each of the main rods 222 or to both the segmented region 225 and the main rods.

Referring to FIG. 4, there is illustrated in a schematic view, an ion guide 320 in accordance with a fourth preferred aspect of the present invention. The ion guide 320 is divided into a plurality of segments 325. The exit of the ion guide 320 is located on the right side of FIG. 4. The same RF voltage can be applied to each segment of the ion guide to radially confine the ion beam. For each segment in the plurality of segments 325, an individual bias voltage—Ui for the $i_{th}$ segment for example, can be superimposed with the RF voltage to control the electrical field in the axial direction. Ui for the first two segments—that is, U1 and U2, are shown in FIG. 4. In general, each bias voltage Ui is individually selected, such that all of the bias voltages together can provide any desired profile along the axis of the ion guide 320. As shown, individual bias voltages U1 and U2 are supplied to their respective segments by independently controllable power supplies P1 and P2. In general, bias voltage Ui is supplied by independently controllable power supply Pi to each rod in the rod set.

Figure 4A:
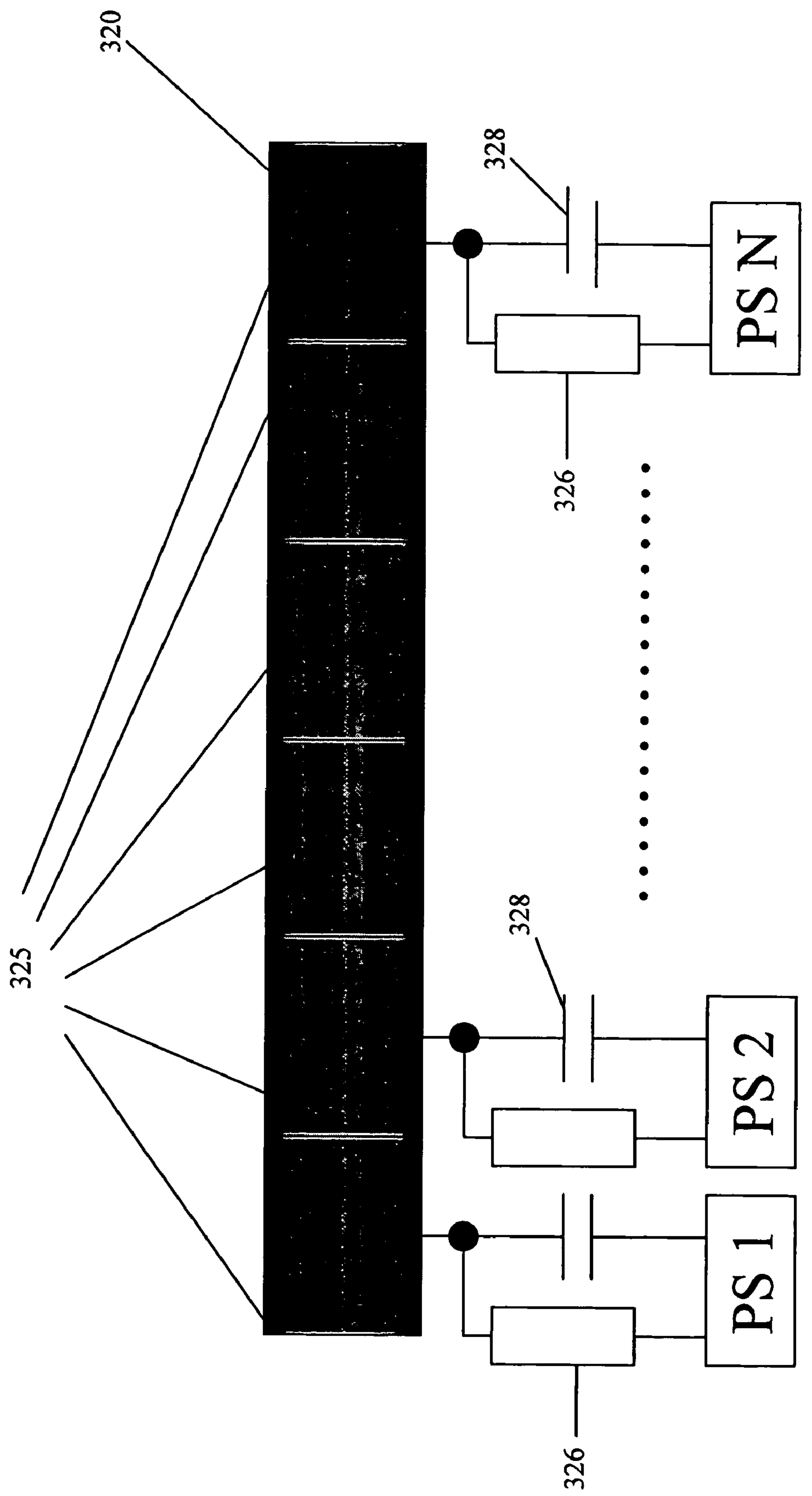

Individual power supplies PSi for each individual segment in the plurality of segments 325 are illustrated in more detail in FIG. 4*a*. As shown, each individual power supply comprises an associated resistor 326 and capacitor 328. The resistors 326 are primarily responsible for determining the particular DC voltage applied to their respective segments, while the capacitors 328 are predominately responsible for determining the AC voltage provided to their respective segments.

The voltage Ui(t) applied to each individual segment PSi can, as shown, also be a function of time. For example, the bias voltages may have the form Un=An+Bn×sin(Ωt), where An is a DC component of the bias voltage and Bn is an amplitude of AC voltage oscillations and Ω is the cycle frequency of AC oscillations. By enabling different bias voltages to be applied to different segments of the ion guide 320, the DC axial force and effective AC force can be varied as desired along the axis of the ion guide 320.

Possible distribution profiles of DC axial force and effective AC force are illustrated as lines 330, 335, 340 and 345 in FIG. 4. Solid line 330 represents the DC electric force that pushes ions towards the exit 327 of the ion guide 320. Similar to the configurations described above in connection with FIGS. 1 to 3, the AC voltage applied to each segment in the plurality of segments 325 varies along the length of the ion guide 320 in such a way that it creates an effective field that acts in the opposite direction, pushing ions away from the exit 327 of ion guide 320. In the example shown in FIG. 4, the effective field resulting from the AC voltage diminishes towards the entrance of the ion guide 320. Effective forces for ions of differing m/z are represented by dashed lines 335, 340 and 345. Dashed lines 335, 340 and 345 have been shown, for simplicity, as straight lines; however, in actuality, these effective forces would be represented by step functions, in which the effective force remains constant over each segment in the plurality of segments 325 of the ion guide 320, and then changes abruptly to a different effective force at a new segment. However, preferably, the dimension of each of the segments in the plurality of segments 325 along the axis of the ion guide 320 should be made as small as possible, such that these step functions approach straight lines 335, 340 and 345.

Ions can be trapped in the ion guide 320 in regions where the DC or axial force in one direction balances the effective force acting in the opposite direction. For example, ions having m/z such that they are subjected to the effective force represented by dashed line 335 can be trapped in region 327 of ion guide 320, while ions having m/z such that they are subjected to an effective force represented by dashed line 340 can be trapped in region 342. Note that ions having m/z such that they are subjected to the effective force represented by dashed line 345 will not be trapped given the AC and DC potentials provided in this case, but can instead be axially ejected from the ion guide 320 via exit end 327.

By changing the bias voltages applied to each segment, ions can be moved toward the exit end 327 of the ion guide 320, and can be sequentially eluted based on m/z ratio.

The ion guides of FIGS. 1 to 3 share a common limitation. The mass selective ejection region between the barrier electrode and the exit electrode or exit rod segment is quite small. As a result, these ions guides have a very limited capacity to space charge. In other words, only a very small number of ions can be allowed into the mass selective regions 27, 127 and 227 of FIGS. 1 to 3 respectively. In contrast, the ion guide 320 of FIG. 4 has a much greater capacity to space charge as ions of different m/z can occupy different regions of the trap, thereby reducing local charge density. Additionally, relative variation of the axial potential can be reduced relative to the ion guides shown in FIGS. 1 to 3, assuming that the rod diameter is the same for all cases. Note that a change in the axial field will always result in a change in the radial field as a consequence of Gauss' theorem (div E=0). Thus, rapidly changing the field in the axial direction can limit the radial confinement abilities of the ion trap.

One drawback of the ion guide 320 of FIG. 4 is that it is rather complicated from an electrical point of view as it requires a number of power supplies PSi that provide independently controlled AC and DC voltages to each segment in the plurality of segments 325 and a RF voltage that would have to be applied to each segment in the plurality of segments 325 to radially confine the ion beam. However, simpler electrical arrangements can be used to achieve variable axial fields in an ion guide, though, at the expense of flexibility in choosing axial distribution of AC and DC voltages. Different compromises between these countervailing desiderata are illustrated in the variance of FIGS. 5, 5*a* and 5*b*.

Referring to FIG. 5, an ion guide 420 in accordance with a fifth aspect of the invention is illustrated in a schematic diagram. The ion guide 420 comprises a plurality of segments 425. In the ion guide 420, a plurality of resistive and capacitive dividers 455 are used to provide AC and DC voltages to each rod in each segment from power supply 422. Each resistive and capacitive divider 455 comprises a capacitor 457 and a resistor 459. In one implementation, each resistor 457 in the plurality of resistive and capacitive dividers 455 has the same value, and each capacitor 459 in the plurality of resistive and capacitive dividers 455 has the same value. This option may be the most convenient for manufacturing reasons. A non-uniform axial field can then be provided by varying the length of the segments 425 along the axis of the ion guide 420, as shown in FIG. 5. Alternatively, the values of the resistors 457 and the capacitors 459 in the dividers 455 could be varied to provide the non-uniform axial field. Note that the capacitors 459 predominantly define AC voltage profile along the ion guide 420, while the resistors define a DC voltage profile along the ion guide. The variants of FIGS. 4 and 5 represent the extreme ends of the compromise between electrical simplicity versus the ability to control variation in the axial fields supplied to the ion guide. However, a number of intermediate compromises between these extremes are possible. Two of these are illustrated in FIGS. 5*a* and 5*b*.

Figure 5A:
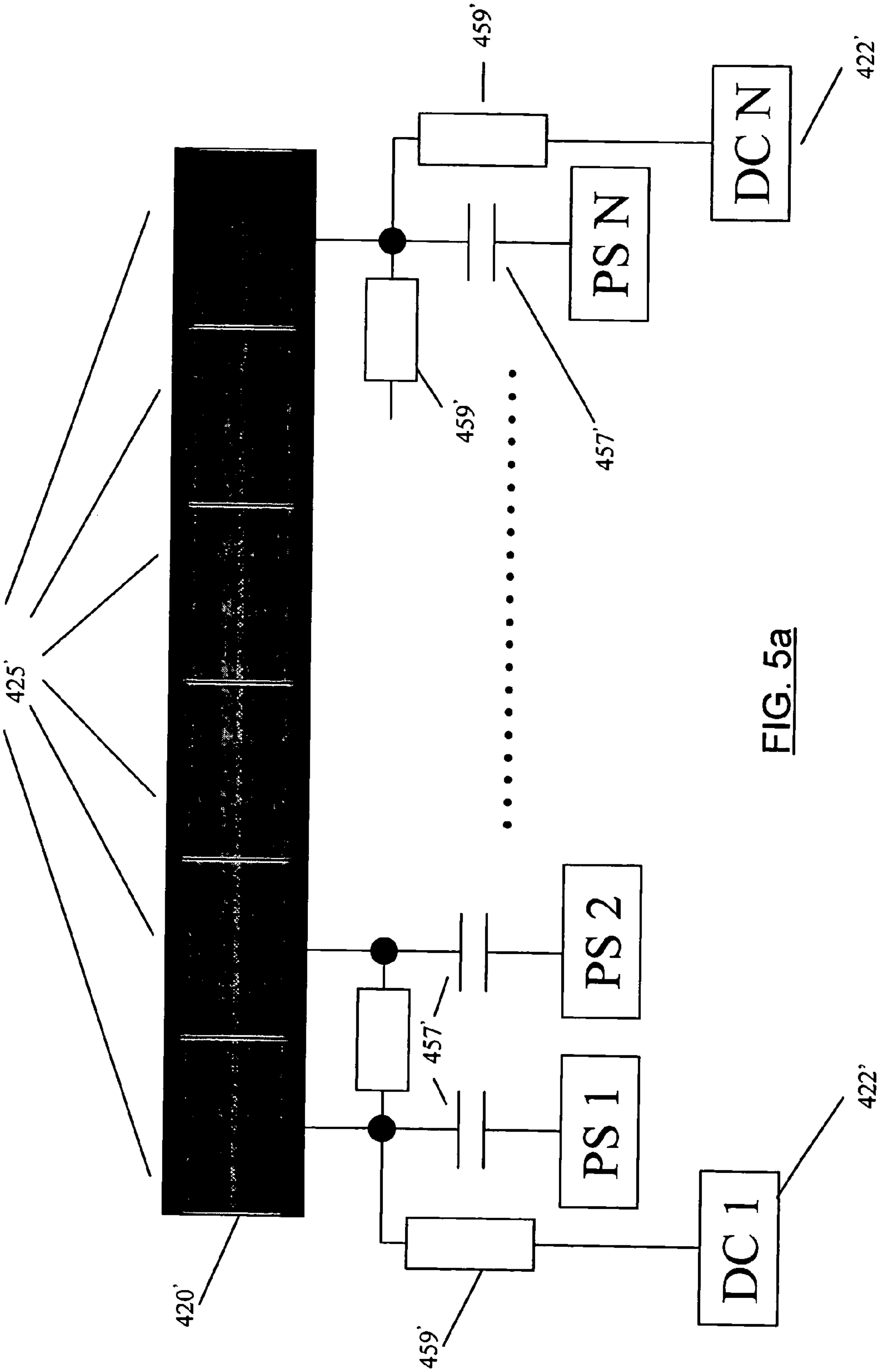
Figure 5B:
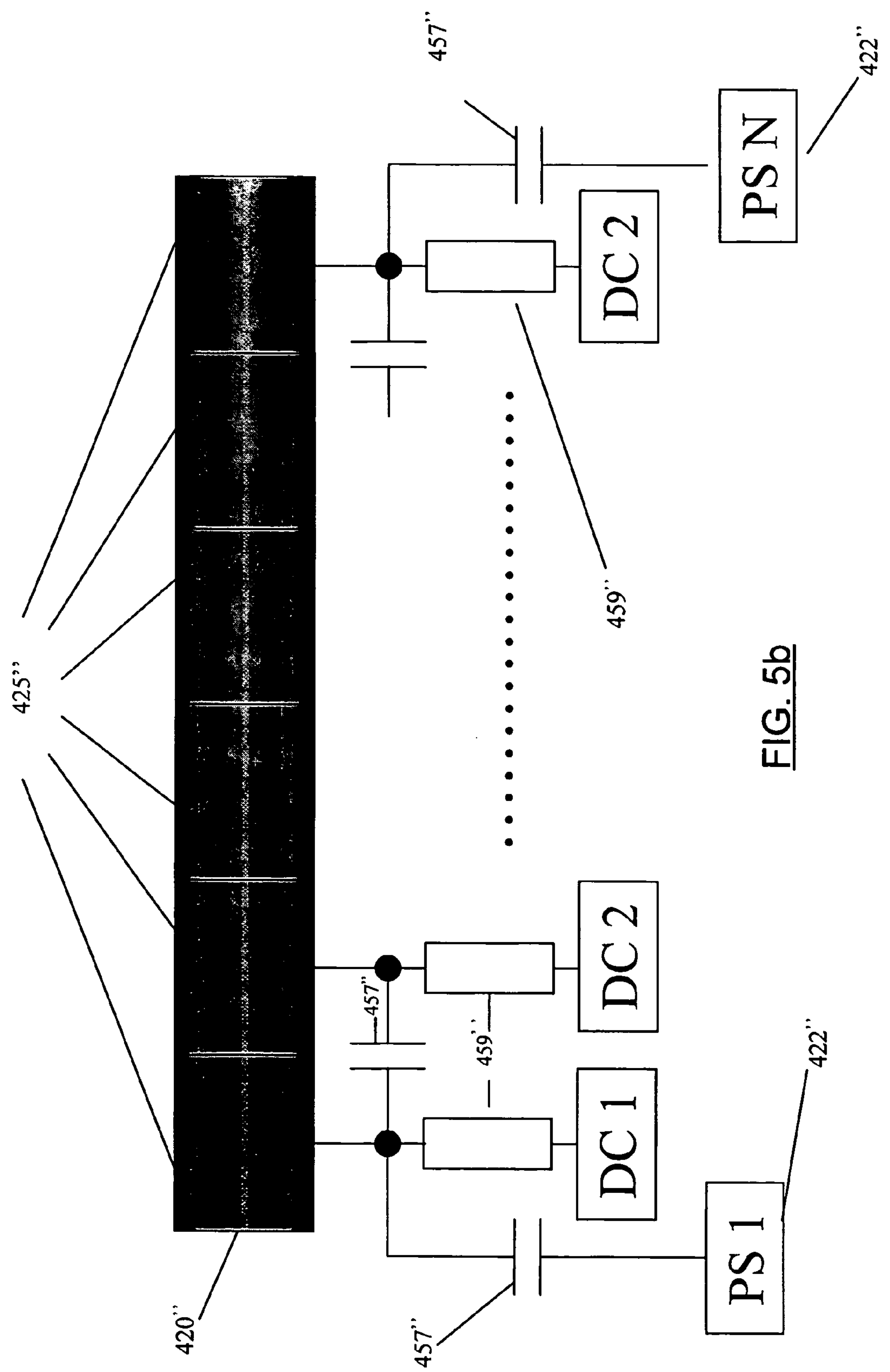

Referring to FIG. 5*a*, there is illustrated in a schematic view, an ion guide 420' in accordance with a sixth aspect of the present invention. For clarity, the same reference numerals, with an apostrophe added, are used to designate elements analogous to those described above in connection with FIG. 5. However, for brevity the description of FIG. 5 is not repeated with respect to FIG. 5*a*.

The AC voltage profile and the DC voltage profile applied to the ion guide of 420 of FIG. 5 are predetermined by the resistors 457 and capacitors 459 as well as by power supply 422. In contrast, the configuration of the power supply for the ion guide 420' of FIG. 5*a* permits the AC voltage profile, but not the DC voltage profile, to be easily changed over time (although, of course the DC applied can be varied in magnitude). That is, a single DC power supply 422' is used to provide a DC voltage profile along the ion guide 420'. This DC voltage profile varies between the plurality of segments 425' of the ion guide 420' based on the resistance of resistors 459'. Thus, the shape of this voltage profile cannot be changed without also changing the resistance of resistors 459'.

However, individual AC power supplies are provided for each segment. That is, each segment i is linked via a capacitor 457 to an AC Power Supply I (PSi). As these individual AC power supplies are independently controllable, the AC voltage provided to each segment in the plurality of segments 425' can be individually controlled.

Referring to FIG. 5*b*, there is illustrated in a schematic view, an ion guide 420" in accordance with a seventh aspect of the invention. For clarity, the same reference numerals, with double apostrophes added, are used to designate element analogous to those described above in connection with FIG. 5. However, for brevity, the description of FIG. 5 is not repeated with respect to FIG. 5*b*.

In FIG. 5*b*, the situation is reversed relative to that of FIG. 5*a*. That is, a single AC power supply 422" is linked via capacitors 457" to each segment in a plurality of segments 425" of the ion guide 420". In this case, the AC voltage profile provided to the ion guide 420" is predetermined by the values of the capacitors 457" although, of course, the magnitude of these AC voltage profiles can be changed by AC power supply 422". In contrast, however, an individual and independently controllable DC i power supply is provided for each $i^{th}$ segment in the plurality of segments 425".

This individual power supply is connected to its associated segment by a resistor 459". In this case, the DC voltage profile provided along the ion guide 420" can be varied over time by independently controlling the individual DC power supplies for each of the segments.

Referring to FIG. 6, there is illustrated in a flowchart a method of separating ions in accordance with a preferred aspect of the present invention. In step 502 of the flowchart of FIG. 6, ions are admitted into the entrance end of the rod set. Then, in step 504, the ions are trapped in the rod set by producing an exit field at an exit member of the rod set adjacent to the exit end of the rod set, and by producing an RF field between the rods of the rod set to radially confine the ions in the rod set. In step 506, a mass-to-charge ratio for separating the ions into at least two different groups of ions is selected. Then, in steps 508 and 510 respectively, a static axial electric field and an oscillating axial electric field are provided within the rod set to separate the ions into a first group of ions and a second group of ions. Both the static axial electric field and the oscillating axial electric field can be produced using either or both of the exit field and RF field produced in step 504. The static axial electric field is used to provide an axial force acting on the ions in a first direction substantially parallel to the longitudinal axis, while the oscillating axial electric field is used to provide an effective force acting on the ions in a second direction opposite to the first direction. According to one aspect of the present invention, the second direction is towards the exit end of the rod set from the entrance end.

It is known that the net force of an oscillating electric field can be approximated by the formula ["Inhomogeneous RF Fields: A Versatile Tool For The Study Of Processes With Slow Ions" by Dieter Gerlich (1992)—from: State-Selected and State-to-State Ion-Molecule Reaction Dynamics, edited by C. Y. Ng and M. Baer. Advances in Chemical Physics Series, LXXXII, J. Wiley & Sons (1992)]

$$m\ddot{R}_0 = -\frac{q^2}{4m\Omega^2}\Delta E_0^2$$

Note that the effective force provided by the oscillating electric field is mass dependent. Therefore, counteraction of the axial force provided by the static axial electric field, which axial force is not mass dependent, and the effective force provided by the oscillating axial electric field, which effective force is mass dependent, can provide separation based on m/z of the ions. Please also note from the above equation that in order for the effective force to be provided, the oscillating axial electric field must vary along the longitudinal axis of the rod set.

The static axial electric field and oscillating axial electric field can be provided in different ways. For example, the static axial electric field can be provided by a DC potential difference between a DC rod offset of the RF field and the static DC component of the exit field, while the oscillating electric field is provided by the alternating AC component of the exit field.

Depending on the mass-to-charge ratio selected, at least one of the oscillating axial electric field or static axial electric field can be adjusted to provide the desired separation. For example, the amplitude of the oscillating axial electric field can be adjusted to change the effective force, thereby changing the m/z threshold at which separation occurs. Alternatively, the amplitude of the static axial electric field can be changed to change the m/z threshold for separation. According to a further variant, the frequency of the oscillating axial electric field can be changed to change the m/z threshold for separation.

In step 512, at least one of the oscillating axial electric field or static axial electric field is adjusted based on the mass-to-charge ratio to axially eject the first group of ions, while retaining the second group of ions within the rod set. Preferably, prior to step 512, both the first group of ions and the second group of ions are trapped in a mass-selective ejection region of the rod set. The mass-selective ejection region extends from the barrier electrode toward the exit end of the rod set. A barrier field is provided at the barrier electrode to trap the ions in the mass-selective ejection region.

Preferably, the mass-selective ejection region is spaced from the exit end as shown in FIGS. 2 and 3.

Alternatively, as shown in FIGS. 4 and 5, the first group of ions may be trapped at a first trapping location, while the second group of ions are trapped at a second trapping location spaced from the first trapping location. This is a consequence of the effective force provided by the oscillating axial electric field varying relative to the axial force along the longitudinal axis of the rod set so that the effective force equals the axial force for the first group of ions at the first trapping location, and equals the axial force for the second group of ions at the second trapping location. This allows ion charge to be spaced along the longitudinal dimension of the rod set as different groups of ions—ions having different m/z ratios—can be trapped at different points along the length of the rod set.

According to preferred aspects of the present invention, the counteracting effective force and axial force are used in an upstream mass spectrometer of a tandem mass spectrometer. Then, in step 514, after the first group of ions have been axially ejected from this upstream mass spectrometer, this first group of ions is subjected to further processing within other components of the tandem mass spectrometer. For example, the first group of ions may be fragmented in a fragmentation cell, and these fragments subsequently subjected to detection, or, the first group of ions may, themselves, be detected after the axial ejection step 512. Detection of the first group of ions axially ejected in step 512 may be by, for example, a TOF analyzer. In this case, preferably, the heavier ions would be axially ejected to the TOF analyzer, while lighter ions are retained, in order to give the heavier ions a headstart on their trip through the TOF analyzer. Subsequently, the lighter ions would be axially ejected to the TOF analyzer.

Thus, as shown in step 516, the second group of ions is axially ejected by changing at least one of the static axial electric field and the oscillating axial electric field. Then, in step 518, similar to step 514 described above, the second group of ions would be subjected to further processing.

Referring to FIG. 7, there is illustrated in a block diagram, a tandem mass spectrometer arrangement 600 in accordance with a yet further aspect of the invention. The tandem mass spectrometer arrangement 600 includes an ion source 602, which admits ions into a mass selective ejection trap 604, such as the ion guide of any of FIGS. 4, 4*a*, 5, 5*a* and 5*b*. As described above in connection with FIG. 6, the ions are trapped in the mass selective ejection trap 604. Then, based on a selective mass-to-charge ratio, a static axial electric field and an oscillating axial electric field are provided within the mass selective ejection trap to separate the ions into a first group of ions and a second group of ions. The axial electric field is used to provide an axial force acting on the ions in a first direction, while the oscillating axial electric field is used to provide an effective force acting on the ions in a second direction opposite to the first direction. Then one of the effective force or axial force is used to axially eject the first group of ions from the mass selective ejection trap 604 to the fragmentation cell 606. In fragmentation cell 606, the first group of ions can be fragmented and then axially ejected and subjected to detection in mass spectrometer 608. Subsequent to the ejection of the fragments of the first group of ions from the fragmentation cell 606, the second group of ions can be axially ejected from the mass selective ejection trap 604 to the fragmentation cell 606 for subsequent fragmentation and downstream detection by mass spectrometer 608.

Referring to FIG. 8, there is illustrated in a block diagram an MS/MS arrangement in accordance with a further aspect of the present invention. In this aspect, ions are ejected from an ion source 702, and passed through a first mass spectrometer 704 for initial mass selection before being provided to a first fragmentation cell 706. Within fragmentation cell 707, the ions selected in the first mass spectrometer 704 are fragmented. Any fragments are then axially ejected to mass selective ejection trap 708, which may comprise any of the ion guides described above in connection with FIGS. 4, 4*a*, 5, 5*a* and 5*b*. Within mass selective ejection trap 708, based on a selective mass-to-charge ratio, the ion fragments are divided into at least two different groups of ions using the static axial electric field and oscillating axial electric field in the manner described above. Then, a selected group in this plurality of fragment ions is axially ejected to a second fragmentation cell 710 for further fragmentation. The resulting fragments are then axially ejected to a third mass spectrometer 712, in which they are subjected to detection. After these resulting fragments are axially ejected from third fragmentation cell 710, other groups of ion fragments stored in mass selective ejection trap 708 can be axially ejected to second fragmentation cell 710 as desired and the process will continue.

Referring to FIG. 9, there is illustrated in a schematic view, an ion guide 820 in accordance with a further aspect of the present invention. The ion guide 820 is divided into a plurality of segments 825, an entrance segment 822 and an exit segment 824. Similar to the ion guide 320 of FIG. 4, for each segment in the plurality of segments 825, an individual bias voltage Ui can be superimposed with the RF voltage to control the electrical field in the axial direction. Ui for the first two segments—that is, U1 and U2, are shown in FIG. 9. In general, each bias voltage Ui is individually selected, such that all of the bias voltages together can provide any desired profile along the axis of the ion guide 820. Individual bias voltages U1 and U2 can be supplied to their respective segments by independently controllable power supplies P1 and P2. In general, bias voltage Ui can be supplied by independently controllable power supply Pi to each segment in the rod set. In this embodiment the individual power supplies Pi for each individual segment in the plurality of segments 825 provide an AC voltage that is opposite in polarity to that of adjoining segments in the plurality of segments 825. Thus, if P1 comprises a negative AC voltage applied to the first segment in the plurality of segments 825, then all of Pi, where i is odd, will comprise a negative AC component, and all Pi where i is even will comprise a positive AC component. Applying the Gerlich formula yields the AC profile 835, in which pseudo-potential wells are provided towards the center of each segment, and maxima are reached where adjoining segments are connected.

To trap the ions the DC field 855 can be set at zero or low value while AC voltage is maintained at a properly high value. After a sufficient number of collisions the ions can precipitate in regions 842 near the bottom of the pseudo-potential wells.

As a result of this configuration, discrete groups of ions 842 can be axially centered towards the centers of individual segments, and there can be very low ion concentrations at the juncture of different segments in the plurality of segments 825. Thus, the configuration of FIG. 9 axially distributes the ions along the longitudinal axis of the ion guide 820.

To mass selectively eject the ions a new DC potential profile 830 sloped towards the exit is applied, by applying DC voltage to individual segments. This new DC potential profile 830 replaces the DC field 855. As the effective force due to the AC profile 835 is mass dependent, and the axial force due to the DC potential 830 is not, heavier ions can be axially ejected from the ion guide 820 while lighter ions are retained. Ions can be sequentially ejected out of the ion guide 820 by either ramping up the DC potential 830 or ramping down the amplitude of the AC potential 835 or ramping up the AC frequency, or by a combination of the above.

Other variations and modifications of the invention are possible. For example, other electrical arrangements in addition to those shown and described in connection with FIG. 5, could be used to provide AC and DC voltages to individual segments of an ion guide. In addition, other methods of creating axial fields and that ion guide can be applied to produce the desired field in the linear ion trap, for example, conductive coatings on the rods can be used instead of segments, or additional auxiliary electrodes can be used to create axial fields. Most of these methods are summarized in U.S. Pat. Nos. 5,847,386 and 6,111,250. Further, while the ion guides described above, and, in particular, the ion guide described in connection with FIG. 4, have been described such that the effective force repels ions from the exit, while the axial force provided by the DC potential pushes ions towards the exit, this configuration could easily be reversed such that the effective force pushes ions towards the exit while the axial force due to the, DC potential pushes ions away from the exit. Alternatively, if desired, the ion guide could be configured to send ions back to the entrance. All such modifications or variations are believed to be within the sphere and scope of the invention as defined by the claims appended hereto.

The invention claimed is:

1. A method of operating a mass spectrometer having an elongated rod set, the rod set having an entrance end, an exit end, a plurality of rods and a longitudinal axis, the method comprising:

(a) admitting ions into the entrance end of the rod set;

(b) producing an RF field between the plurality of rods to radially confine the ions in the rod set;

(c) providing a static axial electric field within the rod set; and (d) separating the ions into a first group of ions and a second group of ions by providing an oscillating axial electric field within the rod set to counteract the static axial electric field, wherein the oscillating axial electric field varies along the longitudinal axis of the rod set.

2. The method of operating a mass spectrometer as defined in claim 1 wherein step (d) further comprises selecting a mass-to-charge ratio for separating the ions into the first group of ions and the second group of ions.

3. The method of operating a mass spectrometer as defined in claim 2 further comprising selecting at least one of an amplitude of the oscillating axial electric field and an amplitude of the static axial electric field based on the mass-to-charge ratio.

4. The method of operating a mass spectrometer as defined in claim 2 further comprising selecting the frequency of the oscillating axial electric field based on the mass-to-charge ratio.

5. The method of operating a mass spectrometer as defined in claim 2 wherein the method further comprises trapping the ions in the rod set by producing an exit field at an exit member adjacent to the exit end of the rod set;

step (c) comprises providing the static axial electric field using at least one of the exit field and the RF field; and, step (d) comprises providing the oscillating axial electric field using at least one of the exit field and the RF field.

6. The method of operating a mass spectrometer as defined in claim 5 wherein the exit field comprises a static DC component and an alternating AC component;

the static axial electric field is provided by a DC potential difference between a DC rod offset of the RF field and the static DC component of the exit field; and, the oscillating axial electric field is provided by the alternating AC component of the exit field.

7. The method of operating a mass spectrometer as defined in claim 2 wherein step (c) comprises using the static axial electric field to provide an axial force acting on the ions in a first direction substantially parallel to the longitudinal axis; and, step (d) comprises using the oscillating axial electric field to provide an effective force acting on the ions in a second direction opposite to the first direction.

8. The method of operating a mass spectrometer as defined in claim 7 wherein the second direction is toward the exit end from the entrance end.

9. The method of operating a mass spectrometer as defined in claim 8 wherein step (d) further comprises axially ejecting the first group of ions and concurrently retaining the second group of ions.

10. The method of operating a mass spectrometer as defined in claim 9 wherein step (b) further comprises trapping the ions in a mass-selective ejection region of the rod set, wherein the mass-selective ejection region extends from a barrier electrode towards the exit end of the rod set and a barrier field is provided at the barrier electrode to trap the ions in the mass-selective ejection region.

11. The method of operating a mass spectrometer as defined in claim 10 further comprising spacing the mass-selective ejection region from the exit end.

12. The method of operating a mass spectrometer as defined in claim 1 wherein step (d) further comprises trapping the first group of ions at a first trapping location along the longitudinal axis and the second group of ions at a second trapping location spaced from the first trapping location along the longitudinal axis.

13. The method of operating a mass spectrometer as defined in claim 12 wherein step (c) comprises using the static axial electric field to provide an axial force acting on the ions in a first direction substantially parallel to the longitudinal axis of the rod set;

step (d) comprises using the oscillating axial electric field to provide an effective force acting on the ions in a second direction opposite to the first direction;

the effective force varies relative to the axial force along the longitudinal axis of the rod set; and the effective force equals the axial force for the first group of ions at the first trapping location and for the second group of ions at the second trapping location.

14. The method of operating a mass spectrometer as defined in claim 13 further comprising, sequentially, in a first ejection stage, changing at least one of the static axial electric field and the oscillating axial electric field to axially eject the first group of ions and concurrently retain the second group of ions; and, in a second ejection stage changing at least one of the static axial electric field and the oscillating axial electric field to axially eject the second group of ions.

15. The method of operating a mass spectrometer as defined in claim 14 further comprising during the first ejection stage, detecting at least some of the axially ejected first group of ions; and, during the second ejection stage, detecting at least some of the axially ejected second group of ions.

16. The method of operating a mass spectrometer as defined in claim 14 further comprising during the first ejection stage, fragmenting at least some of the axially ejected first group of ions; and, during the second ejection stage, fragmenting at least some of the axially ejected second group of ions.

17. The method of operating a mass spectrometer as defined in claim 1 wherein step (d) comprises changing a polarity of the oscillating axial field along the longitudinal axis of the rod set to provide a plurality of regions for trapping ions.

18. A mass spectrometer system comprising:

(a) an ion source;

(b) a rod set, the rod set having a plurality of rods extending along a longitudinal axis, an entrance end for admitting ions from the ion source, and an exit end for ejecting ions traversing the longitudinal axis of the rod set; and, (c) a power supply module for producing an RF field between the plurality of rods of the rod set, wherein the power supply module is coupled to the rod set to provide a selected static axial electric field and a selected oscillating electric field such that (i) the selected oscillating axial electric field varies along the longitudinal axis of the rod set, and (ii) the selected static axial electric field and the selected oscillating axial electric field counteract each other to separate the ions into a first group of ions and a second group of ions based on a selected mass-to-charge ratio.

19. The mass spectrometer system as defined in claim 18 further comprising an exit member at the exit end of the rod set, the power supply module being operable to provide an exit field at the exit member to trap the ions in the rod set; and, a mass-selective ejection region for storing the ions beside the exit member.

20. The mass spectrometer system as defined in claim 19 wherein the exit member extends from the exit end toward the entrance end of the rod set to space the mass-selective ejection region from the exit end.

21. The mass spectrometer system as defined in claim 20 wherein the exit member comprises, for each rod in the plurality of rods of the rod set, an exit segment of the rod.

22. The mass spectrometer system as defined in claim 18 wherein each rod in the plurality of rods of the rod set comprises a series of segments, and the power supply module comprises, for each segment in the series of segments, a segment-specific power supply for providing an independently controllable voltage to that segment, the segment-specific power supply being coupled to that segment.

23. The mass spectrometer as defined in claim 22 wherein the segment-specific power supply is operable to provide AC voltages of opposite polarity to adjoining segments in the series of segments to provide a plurality of regions for trapping ions.

24. The mass spectrometer system as defined in claim 18 wherein each rod in the plurality of rods of the rod set comprises a series of segments, the power supply module is electrically coupled to a first segment at the entrance end of the rod set and to a last segment at the exit end of the rod set to provide a selected AC voltage and a selected DC voltage between the first segment and the last segment of the rod set, and each segment in the series of segments, except for the first segment, is electrically coupled to a preceding segment in the series of segments.

25. The mass spectrometer system as defined in claim 24 further comprising a plurality of capacitive dividers, each capacitive divider comprising a resistor and a capacitor, wherein each segment in the series of segments, except for the first segment, is electrically coupled to the preceding segment in the series of segments by a unique associated capacitive divider in the plurality of capacitive dividers.

26. The mass spectrometer system as defined in claim 25 wherein the series of segments vary in length to vary the selected static axial field and the selected oscillating electric field between different segments in the series of segments.

27. The mass spectrometer system as defined in claim 25 wherein the plurality of capacitive dividers vary in at least one of resistance and capacitance to vary at least one of the selected static axial field and the selected oscillating electric field between different segments in the series of segments.

28. The mass spectrometer system as defined in claim 18 wherein the mass spectrometer system is a tandem mass spectrometer system, and further comprises a secondary rod set downstream from the rod set for receiving ions ejected from the rod set for further processing.

* * * * *